United States Patent [19]

Andersen

[11] Patent Number: 4,702,161
[45] Date of Patent: Oct. 27, 1987

[54] SPRAY-TYPE INTEGRATED VEGETABLE BLANCHER AND COOLER

[76] Inventor: Niels J. Andersen, 3 StÅlbjergvej, DK-5683 Broby, Denmark

[21] Appl. No.: 696,666

[22] Filed: Jan. 30, 1985

[51] Int. Cl.⁴ .................... A23N 12/00; A23L 3/00
[52] U.S. Cl. ........................... 99/470; 99/477; 99/483; 99/536
[58] Field of Search ............... 99/443 R, 443 C, 467, 99/468, 470, 473–475, 477, 483, 485, 487, 516, 534, 536; 426/520, 521, 511, 510, 524

[56] References Cited

U.S. PATENT DOCUMENTS

| | | | |
|---|---|---|---|
| 2,692,200 | 10/1954 | Olson | 99/477 X |
| 3,982,481 | 9/1976 | Console et al. | 99/477 |
| 4,248,141 | 2/1981 | Miller | 99/483 |
| 4,255,459 | 3/1981 | Glen | 99/470 X |
| 4,543,263 | 9/1985 | Goldhahn | 99/470 X |

*Primary Examiner*—Timothy F. Simone
*Attorney, Agent, or Firm*—Thomas R. Vigil

[57] ABSTRACT

An apparatus for blanching and cooling vegetable products comprises a perforated product conveyor belt having an upper belt run which extends and travels through a treatment tunnel defined in a casing of the apparatus. A layer of vegetable product is transported on the upper belt run through successive treatment zones defined in the treatment tunnel. The treatment zones are provided with arrangements of spray nozzles which are located to spray liquid onto the upper belt run and the layer of product thereon. The nozzle arrangement comprises upper nozzle units adapted to spray liquid on the top surface of the product layer, and may also include lower nozzle units adapted to spray liquid onto the underside of the perforated upper belt run. In a blanching zone, the product layer is sprayed with a blanching liquid which is recirculated and maintained at a desired blanching temperature. The blanching zone is followed by a cooling zone in which the product layer is cooled by spraying a cooling liquid thereon. Preferably, the heat absorbed by the cooling liquid is recovered by being used in a product preheating zone ahead of the blanching zone.

17 Claims, 7 Drawing Figures

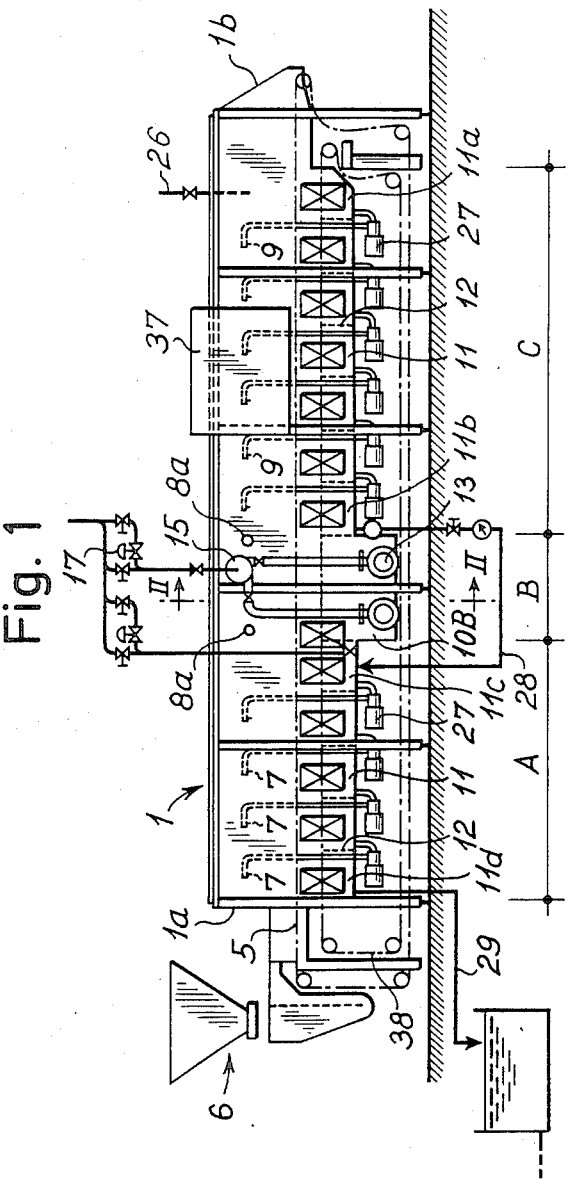
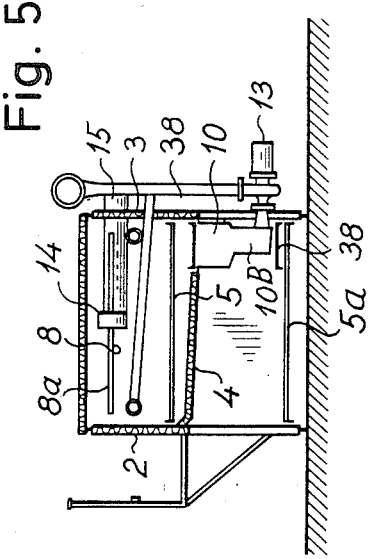
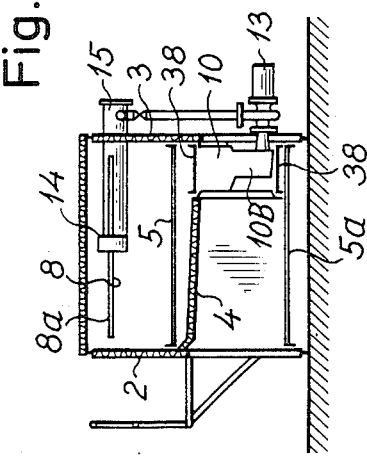

SPRAY-TYPE INTEGRATED VEGETABLE BLANCHER AND COOLER

The present invention relates to vegetable blanching in general and more particularly to improvements in vegetable blanchers.

Generally speaking, blanching is a heat treatment which is to be performed to most vegetables prior to freezing or canning, and whereby raw vegetable products are heated during a relatively short period of time and are cooled immediately thereafter.

Usually, blanching is performed in order to accomplish one or more of the following purposes: inhibition or destruction of enzymes which otherwise would continue to degrade or decomposite the product even after freezing; coagulation of proteins which—if the product is canned unblanched—would coagulate during the canning and thereby make the brine cloudy; removal of undesired flavours; removal of enclosed cellular air and oxygen which otherwise would cause oxidation and other reductions in the quality of the product; and improvements as to the microbial status by reducing the contents of bacteria and other microorganisms such as yeast and mould.

Basically, blanching is a simple process, but when blanching is to be practiced on larger scales, there are rather many problems associated therewith such as high operational costs as regards consumption of energy and fresh water, and also environmental problems due to release of large quantities of heavily polluted waste water.

During a blanching process, inevitably, there will be some leaching from the product of water soluble components, such as vitamins, flavours, carbonhydrates and other nutrients, when water or steam is used to heat the vegetable products. Obviously, such leaching is undesired and should be kept at a minimum, since losses of soluble components not only adversely affect the nutritive value and taste, but are also of great importance to the biological condition of the effluent or waste water.

Other essential requirements which should be fulfilled by industrial vegetable blancher plants, comprise: uniform and effective distribution and transfer of heat to the individual units of product; completely uniform blanching time for all units of product; low damaging of the product during the entire blanching and cooling process; and low consumption of energy and water. In addition, these requirements should be fulfilled independently of the actual product flow rate.

Generally, blanchers of the prior art have been divided into two main types i.e. steam blanchers and water blanchers.

Steam blanchers, in which the vegetable products are heated by means of steam, provide a low leaching of solubles and a low pollution due to the small volume of effluents. On the other hand, the efficiency as to energy utilization is generally low, and the working environment is rather unpleasant due to noise and leakage or escape of steam from the plant.

In water blanchers, which heat the products by means of hot water, the thermal energy efficiency is considerably improved relatively to that of steam blanchers. However, the losses due to leaching of solubles and also the volume of effluents are considerably larger for water blanchers than for steam blanchers.

An example of existing industrial blancher and cooler plants is the so-called drum blancher in which the products are fed in an even, continuous flow into a rotating, perforated drum which is equipped with internal screw means. The drum is disposed horizontally and partially submerged in water contained in a vessel, and the water is heated by direct steam injection controlled by an automatically operating steam valve. The drum rotates slowly, and the internal screw means move the product which is floating in the water. At a discharged end, the drum has shovel devices which lift the product out of the water and dump the product on a chute from which the product is discharged to a cooler in which a continuous supply of cold fresh water is in counterflow with the product.

Such drum blanchers are not able to fulfill the requirements mentioned above to a desirable extent. In particular, the control of temperature and heat transfer is difficult to perform with sufficient accuracy, and the mechanical damaging of the products is rather great due to the grinding effect of the rotating drum.

It is a principal object of the present invention to provide an integrated blancher/cooler apparatus which fulfills the requirements mentioned above.

It is a further object of the invention to provide an integrated blancher/cooler apparatus by which high yields are obtainable, not only because of low leaching of solubles from the product, but also due to gentle handling and transport of the product resulting in less mechanical damaging.

Another object of the present invention is to provide an integrated blancher/cooler of over-blanching due to accurate temperature and flow control.

A still further object of the present invention is to provide an integrated blancher/cooler apparatus which combines the advantages of water-blanching and steam-blanching but eliminates the drawbacks thereof.

With these and other obejcts in view, the invention will best be understood from a consideration of the following detailed description taken in connection with the accompanying drawings in which FIG. 1 is a schematic representation of an integrated blancher/cooler apparatus shown in a side elevation view;

FIG. 2 is a sectional view taken along the line II—II in FIG. 1;

FIG. 5 is a sectional view taken along the line V—V in FIG. 3;

Figure 3:
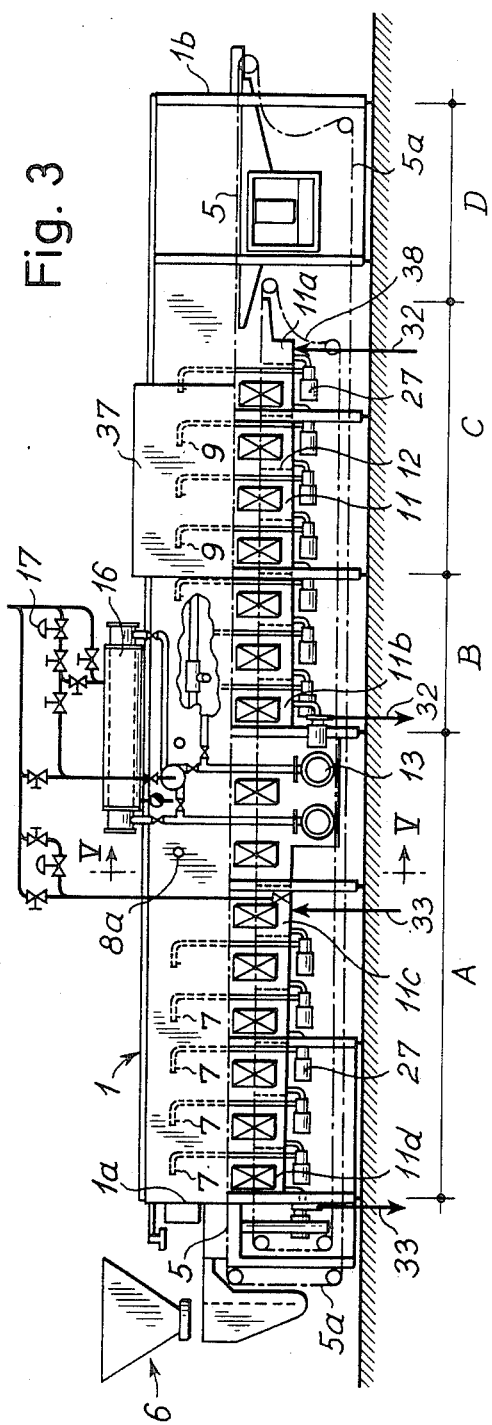
FIG. 3 is a schematic representation of a further integrated blancher/cooler apparatus shown in a side elevational view.

Referring now to the drawings, each of the apparatuses shown comprises an elongated hull or casing 1 which includes opposite longitudinal side walls 2, 3 and a generally horizontal floor 4 between the side walls. The floor 4 defines a liquid-proof deck which closes the spacing between the two side walls and thereby defines a product treatment tunnel which extends longitudinally through the casing 1 from a product inlet end 1a to a product outlet or discharge end 1b. The treatment tunnel is closed upwardly by a top covering which preferably consists of several removable top cover plates.

An endless product conveyor belt is arranged through the interior of the casing 1 and has an upper belt run 5 which extends through the treatment tunnel. The conveyor belt has a width substantially corresponding to the width of the treatment tunnel and the upper belt run 5 is located above the tunnel floor 4 while a lower belt run 5a is located at the bottom area of the casing 1.

The endless product conveyor belt is movable by an infinitely variable gear motor (indicated at 5b in FIG. 4), and in operation the upper belt run 5 continuously receives an even or uniform layer of vegetable product to be treated at the inlet end 1a. For that purpose a product feeder unit 6 is adapted to receive the product and to continuously supply and distribute it to the upper belt run 5 as an even layer across the upper surface thereof.

The conveyor belt is perforated or permeable to such an extent that liquid rather easily can flow through the upper belt run 5, while the layer of vegetable product is retained on the upper surface thereof for transportation through the treatment tunnel.

The treatment tunnel includes successive product treatment zones between the inlet end 1a and outlet end 1b. A first treatment zone, as viewed from the inlet end 1a, is a product preheating zone A which comprises a nozzle arrangement including a plurality of spray nozzles 7 which are arranged in the treatment tunnel to spray preheating liquid onto the layer of product on the moving upper belt run 5.

The preheating zone is followed by a product blanching zone B which comprises an arrangement of blancher nozzles, such as nozzles 8, which are adapted to uniformly spray heated blanching liquid onto the product layer on the upper belt run within the area of the blanching zone B.

The blanching zone B is followed by a product cooling zone which includes a plurality of spray nozzles 9 which are arranged to spray cooling liquid onto the layer of product as it passes through the cooling zone C supported on the upper belt run 5.

In order to collect liquid, which has been sprayed through the various nozzles and has passed through the upper conveyor belt run 5, the interior floor or deck 4 is provided or combined with a generally gutter-shaped sump which is designated in general by reference numeral 10 and extends longitudinally at least below the treatment zones A, B and C.

The sump 10 is divided into successive sump sections by means of transverse partitions walls or bulkheads. At least a sump section 10B below the blanching zone B is separated from the respective adjacent sump sections below the preheating and cooling zones by means of transverse bulkheads and, furthermore, the bottom level of the sumps section 10B may be recessed relative to the bottom level of adjacent sump sections as indicated in FIGS. 1 and 3.

Accordingly, blanching liquid which is sprayed through nozzles in the blanching zone B and is collected in the sump section 10B can, at least in principle, be maintained separated from the treatment liquids in the adjacent sump sections. As a result a relatively small volume of blanching liquid (typically 150 liters per meter of length of the zone B) can be recirculated in what could be considered as a closed liquid flow circuit which includes the blancher nozzle arrangement, the sump section 10B and at least one circulation pump 13 which transfers the blanching liquid from the sump section 10B to the arrangement of blancher nozzles, such as nozzles 8, for spraying therethrough.

This transfer of blanching liquid takes place through a heating system, whereby the blanching liquid is reheated to a desired temperature which is adjustable and controllable as will be further described later on.

With a sufficient capacity for each circulation pump 13, typically 1000 liters per minute, it is possible, at least in principle, to continuously recirculate the same relatively small volume of blanching liquid very rapidly. However, in actual operation there may be some carry-over of liquid from the preheating zone A to the blanching zone B and from the blanching zone B to the cooling zone C due to liquid entrained by the upper conveyor belt run 5 and by the layer of product supported and transported thereon.

Due to this rapid circulation and spraying of the blanching liquid, and because of the resulting relatively high liquid velocity, when the liquid passes through the product layer, the heat transfer from the recirculated liquid is substantially uniform during the spraying. The high flow rate also provides for low drop in the average temperature of the liquid during each passage through the product layer. Typically, this temperature drop will not exceed 1° C. from top to bottom of the layer.

Accordingly, each single piece of vegetable product in the layer will be flushed with blanching liquid of substantially the same temperature, and thereby the distribution and transfer of heat to the individual pieces or units of product will be very effective and uniform through the layer of product. Also a desired blanching temperature can be maintained rather accurately and thereby the possibility of over-blanching is almost eliminated, since the blanching time for each individual piece of product is determined by the travelling speed of the upper conveyor belt run 5.

The fact that substantially the same volume of blanching liquid is recirculated in the blanching zone also provides a very low degree of leaching of solubles from the product in the blanching zone, since the recirculating volume of liquid rather quickly will be almost saturated with such solubles and further leaching thereafter will be at a minimum.

In each apparatus illustrated in the drawings, the arrangement of blancher nozzles includes upper spray nozzles 8 above the upper belt run 5 and directed to spray blanching liquid towards the top surface of a layer of vegetable product thereon. As indicated, in particular in FIGS. 2 and 5, an appropriate number of such upper nozzles 8 may be arranged along transverse liquid supply tubes 8a, which receives pressurized blanching liquid from a liquid manifold 14 which is connected with a liquid supply chamber 15.

In the embodiment illustrated in FIGS. 1 and 2, this supply chamber 15 receives liquid from the circulation pump 13, and the liquid is heated either by injecting steam directly into the chamber 15 as indicated in FIG. 1, or by indirectly heating via a heat exchanger 16 which receives steam for heating the liquid as indicated in FIG. 3. In either case, the supply of steam and thereby the heating of the blanching liquid is controlled by a temperature controlled steam valve 17.

Figure 6:
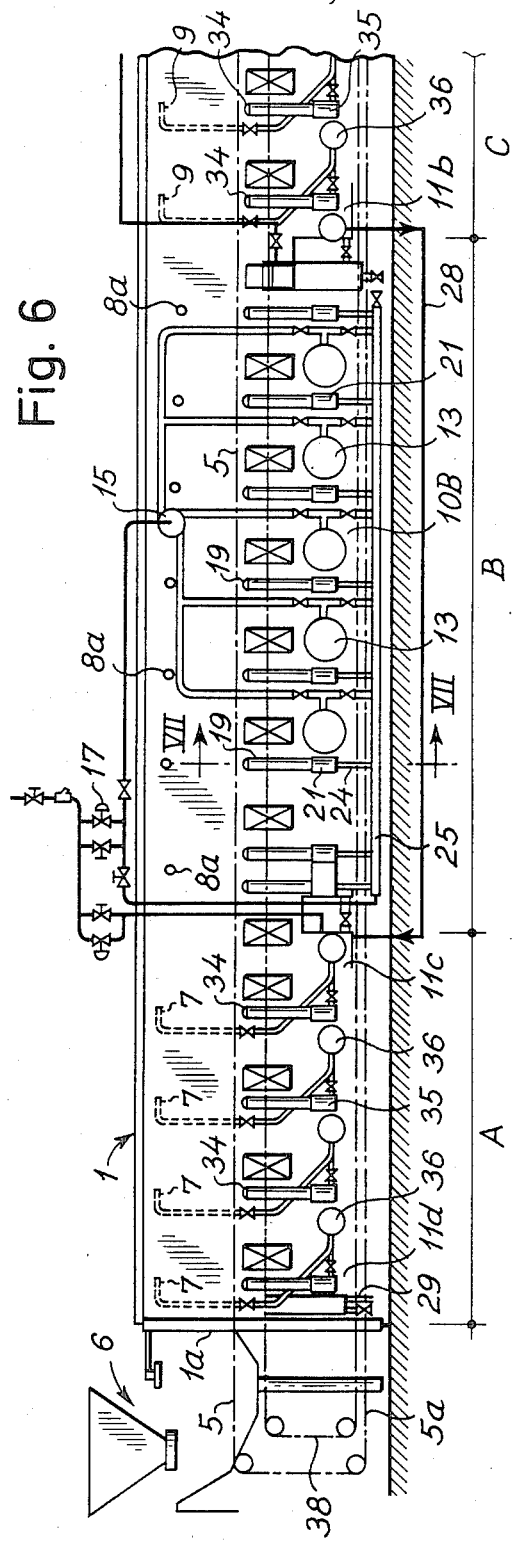
FIG. 6 is a schematic representation of a still further integrated blancher/cooler apparatus in accordance with the invention and shown in side elevation.
Figure 7:
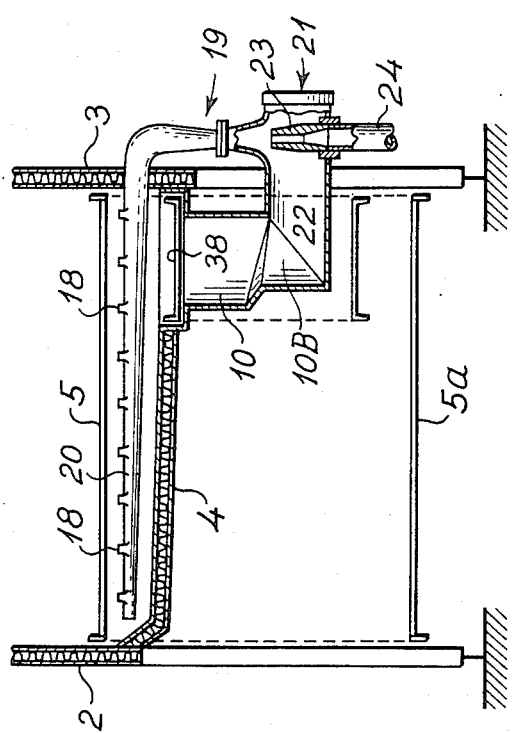
FIG. 7 is a sectional view taken along the line VII—VII in FIG. 6.

In accordance with a particular aspect of the present invention, the arrangement of spray nozzles in the blanching zone B also includes lower spray nozzles 18 arranged in the spacing between the floor or deck 4 and the upper conveyor belt run 5. Preferably, such lower nozzles are arranged as nozzle units 19 distributed or spaced along the length of the blanching zone B as illustrated in FIG. 6. Preferably and as illustrated in FIG. 7, each unit 19 comprises a hollow nozzle bar 20 which supplies a set of lower spray nozzles 18 with blanching liquid for spraying therethrough towards the underside of the belt run 5. The liquid thus sprayed will be able to penetrate the perforated belt run 5 and thereby impinge on the bottom of the layer of product which is supported on the belt run 5. Thereby, the pieces or units of vegetable product can be moved to some extent in the layer of product so that the possibility of uniformly and effectively blanching each piece or unit is still further improved.

This feature is particularly important or advantageous in connection with blanching of e.g. spinach or other vegetables of similar type which otherwise could be compressed in the layer on the conveyor belt if only upper spray nozzles, such as nozzles 8, were used.

However, the sprays from the lower nozzles 18 should not impinge too strongly on the bottom of the product layer in order that the product is not excessively thrown away from the conveyor belt. For that purpose, the nozzle bar 20 receives liquid from a jet pump unit 21 which includes a liquid intake 22 connected with the liquid sump section 10B below the blanching zone B. An ejector 23 in unit 21 receives pressurized liquid from the circulation pumps 13 through a supply tube 24 and a manifolding tube 25. Accordingly, each jet pump unit 21 serves to adapt or reduce the pressure at which blanching liquid is supplied to the lower nozzle 18.

Referring now again to the drawings in general, the cooling zone C of each apparatus illustrated comprises a nozzle arrangement including the spray nozzles 9. The general object of this nozzle arrangement is to cool the product from the blanching temperature, which typically is 90° C., as much as possible and at least down to a discharge temperature, which typically is 10°–20° C., and which is suitable or appropriate for transferring the cooled product directly to continuously operating freezer equipment.

For that purpose, the cooler nozzle arrangement is preferably adapted to perform the product cooling by spraying cooling liquid, usually fresh water, in a step by step arrangement, along the length of the cooling zone C and in counterflow with the product, i.e. oppositely to the travelling direction of the product layer on the belt run 5.

In order to obtain that action, the liquid sump below the cooling zone C is divided into successive sump section 11 by means of transverse partition walls or bulkheads 12. A last sump section 11a which is adjacent to the discharge end 1b, receives the cooling water with its lowest temperature, e.g. from a fresh water inlet (at 26 in FIG. 1).

A pumping unit or stage 27 is adapted to transfer cold liquid from sump section 11a and to an associated spray nozzle assembly which includes a set of the spray nozzles 9. This nozzle assembly sprays the water onto the conveyor belt 5 and the product layer thereon over an area which is located above the last but one sump section 11 which collects the water thus sprayed. This transfer and spraying of the water continues step by step in counterflow with the product and by means of further pumping units corresponding to unit 27 and respective spray nozzle assemblies associated therewith and eventually the water is collected in a first sump section 11b which is adjacent to the blanching zone B.

Because of the counterflow, the water will be sprayed over product having higher and higher temperatures, the closer the water comes to the blanching zone B and the water temperature will rise correspondingly. In the first sump section 11b, the cooling water will, accordingly, have its highest temperature, typically 80° C. and the water contains heat which can be utilized e.g. to treat or preheat the product in zone A before its enters the blanching zone B.

Preferably, the preheating zone is arranged in the same manner as just described in connection with the cooling zone C, i.e. with liquid sump sections 11 and respective pumping units or stages corresponding to unit 27 for transferring preheating liquid from sump section to sump section via associated spray nozzles assemblies which include sets of the nozzles 7. In this manner hot liquid, usually water, which is received in a last sump section 11c of the preheating zone A, will be transferred and sprayed step by step in counterflow with the product and eventually the water is collected in a first sump section 11d which is adjacent to the product inlet end 1a. During this counterflow the water transfers heat to the product which is preheated thereby.

With a preheating zone arranged in this manner, the utilization of the heat of the cooling liquid in sump section 11b can be made in at least two manners.

Thus, the heated or hot cooling liquid can be pumped directly from sump section 11b and into sump section 11c in the preheating zone A through a connection conduit 28 which by-passes the blanching zone B as indicated in FIGS. 1 and 6. In this embodiment, the cooled preheating water is discharged from the first sump section 11d as indicated at 29.

Figure 4:
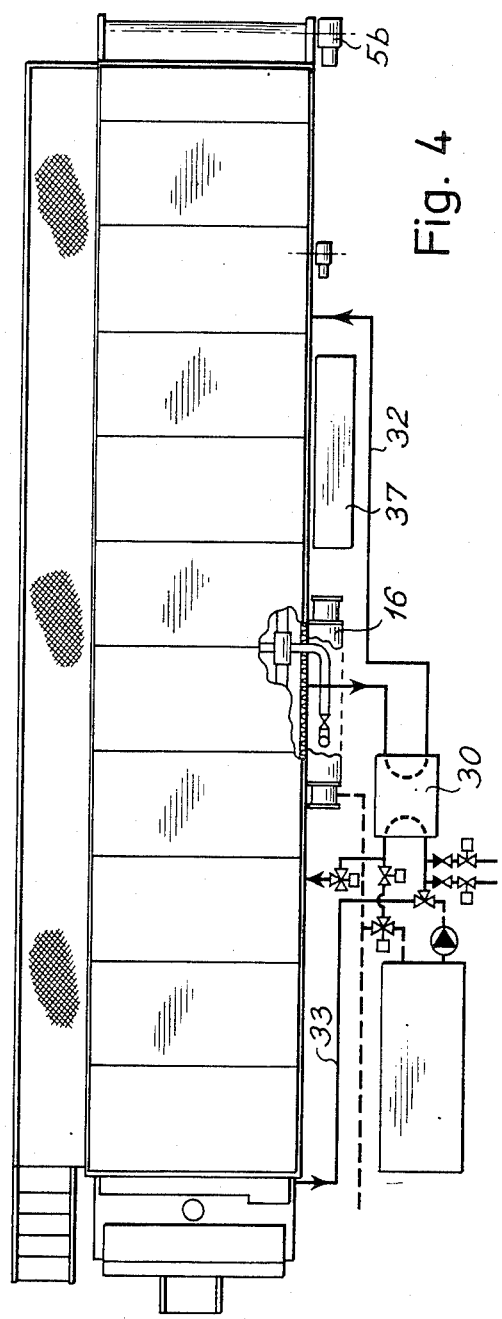
FIG. 4 is a top plan view of the apparatus shown in FIG. 3.

Alternatively, the heat in the cooling water in sump section 11b can be transferred to the preheating liquid or water by means of a heat exchanger 30 as indicated in FIG. 4.

In this manner, the cooling zone as well as the preheating zone can be arranged as separate liquid systems, and in each of these systems a specific volume of liquid can be recirculated in what could be considered as respective closed liquid circuits. Thus, after being cooled in the heat exchanger 30, the cooling liquid can be returned to the last sump section 11a as indicated at 32 in FIG. 4. Similarly, the cooled preheating liquid can be returned from the first sump section 11d through a conduit 33 which extends to the heat exchanger 30 and to the sump section 11c which then receives liquid which has been re-heated by means of heat recovered from the cooling liquid.

As illustrated in FIG. 6, it would also be advantageous to arrange lower spray nozzle units 34 so that at least some of the spray nozzle assemblies in the preheating and cooling zones comprise an upper nozzle unit 7 or 9 and a lower nozzle unit 34. Such lower nozzle units 34 may be arranged and can operate in a similar manner as described in connection with FIG. 7 with respect to the lower blancher nozzle unit 19.

Each of the lower nozzle units 34 can be supplied separately with liquid for spraying therethrough. However, in the embodiment shown in FIG. 6, the upper and lower nozzle units of each nozzle assembly are supplied with pressurized liquid from the same pump 36. As a result, each such pumping unit which comprises an upper nozzle unit 7 or 9, a lower nozzle unit 34 and a pump 36, would operate as the pumping units or stages 27 described above in connection with FIGS. 1 and 3.

In particular, each of such pumpings units or stages in the preheating and cooling zones may comprise the pump 36 with an outlet conduit which is branched as indicated to supply pressurized liquid to the upper spray nozzles 7 or 9 and to supply pressurized liquid to a jet pump unit 35.

The jet pumpt unit operates as explained in connection with FIG. 7 and serves to modify or reduce the pressure supplied to the lower nozzle unit 34.

Generally speaking, the flow of cooling water in zone C should be sufficient to absorb the heat from the product, since otherwise the product cannot be properly and adequately cooled. If, on the other hand, the flow of cooling water is to big, then the product will be properly cooled but the heated cooling water collected in the sump section 11b will have a lower temperature. Accordingly, the utilization of the heated cooling water to preheat the product in zone A will be less effective.

Thus, the respective counterflows of liquid in zones A and C should be related, regulated and controlled in relation to the actual flow of product on the moving upper belt run 5. For that purposes and also to ensure an accurate and reliable operation, there is provided automatic liquid level and temperature sensors, automatic valves, meters for actual product flow and liquid counterflow, and also other devices for controlling, monitoring and recording.

A control panel is indicated at 37 in FIGS. 1, 3 and 4, and may also include a computer for coordinating and controlling the operations.

In order to ensure a reliable operation, it is also necessary that the various nozzles which spray liquid supplied from the liquid sump 10, do not become clogged by small vegetable particles which have been able to pass through the perforated upper belt run 5. Therefore, it is advantageous to cover the sump 10 with an endless filter belt 38 which extends along the sump 10 and has an upper filter belt run which covers the entrance opening to the sump 10. Accordingly, any liquid has to pass through the filter belt 38 before being colleced in the sump 10.

The treatment tunnel, through which the upper run 5 of the product conveyor belt extends and travels during operation, comprises or defines at least the blanching zone B and the cooling zone C so as to provide an integrated blancher and cooler apparatus. Preferably, and as explained above, the treatment tunnel also includes or defines a preheating zone such as zone A. However, the treatment tunnel may also include additional treatment zones such as zones for preflushing or dewatering the product.

In FIGS. 3 and 4 the cooling zone C is followed by an additional zone D in which the product layer is further treated before being discharged at the product outlet end 1b. As an example, zone D may provide further cooling of the product, e.g. by evaporative cooling. For that purpose zone D may include or be associated with a fan unit which is adapted and arranged to force air through the product layer in zone D.

Evaporative cooling by air suction also provides the advantage that the product can be discharged with less liquid on the surfaces of the individual pieces of product.

From the foregoing description it will be apparent that the present invention provides a number of advantages, some of which have been described while others are inherent in the invention or are easily understood at least by persons skilled in the art.

It is to be understood that the drawings and the above description are to be interpreted as merely illustrating principles of the invention, rather than as limiting the same in any way. Various changes and modifications may be made to achieve like results without departing from the spirit of the invention or the scope of the appended claims.

I claim:

1. An apparatus for blanching vegetable products and comprising in combination:
    an elongate casing having a product inlet end and a product outlet end, said casing including longitudinally extending, opposite and spaced apart side walls, a floor which extends between said inlet and outlet ends and closes the spacing between said side walls to define a product treatment tunnel above said floor, and successive product treatment zones between said inlet and outlet ends of said elongate casing within said product treatment tunnel,
    a perforated product conveyor belt having an upper belt run for receiving and supporting a layer of vegetable product thereon and for moving said layer from said inlet end, through said product treatment zones to said outlet end, said upper belt run being arranged to move above said floor in spaced relation thereto,
    a product feeder unit arranged at said product inlet and for receiving said vegetable product and supplying and distributing said vegetable product to said conveyor belt as an even layer across said upper belt run,
    a product blanching zone arranged in said treatment tunnel as a first one of said treatment zones therein and comprising a blancher nozzle arrangement including a plurality of spray nozzles arranged to spray heated blanching liquid onto said layer of product on said upper conveyor belt run,
    a product cooling zone arranged in said treatment tunnel as a successive treatment zone therein after said blanching zone therein, said cooling zone comprising a nozzle arrangement including a plurality of spray nozzles arranged to spray cooling liquid onto said layer of product on said upper conveyor belt run,
    a sectioned liquid collecting sump arranged to receive liquid from said product treatment tunnel at said floor thereof, sump sections below said blanching zone being separated from sump sections below said cooling zone,
    at least one circulation pump for transferring said blanching liquid from an associated sump section below said blanching zone to said blancher nozzle arrangement for spraying therethrough, said transfer being performed through means for controlled heating of said blanching liquid, and said blancher nozzle arrangement including upper spray nozzle units arranged above said upper conveyor belt run and directed toward a top surface thereof, as well as lower spray nozzle units arranged in the spacing between said floor and said upper belt run and directed toward an underside of said belt run.

2. An apparatus as defined in claim 1, wherein each of said lower spray nozzle units comprises a hollow nozzle bar for supplying pressurized blanching liquid to a set of lower spray nozzles for spraying onto the underside of said upper belt run, said nozzle bar receiving pressurized liquid from an outlet of a jet pump unit which includes a liquid intake connected with said sump section below said blanching zone, and an ejector receiving pressurized liquid from said circulation pump.

3. An apparatus as defined in claim 1, wherein said nozzle arrangement in said cooling zone comprises upper spray nozzle units arranged above said upper conveyor belt run and directed towards the top surface thereof, as well as lower spray nozzle units arranged in the spacing between said floor and said upper belt run and directed towards the underside of said belt run.

4. An apparatus as defined in claim 1 wherein said product cooling zone comprises pumping units arranged at intervals along said liquid collecting sump, for transferring cooling liquid from an associated section of said liquid collecting sump to an associated spray nozzle assembly for spraying therethrough, said associated spray nozzle assembly being located to spray said transferred liquid onto said upper conveyor belt run at an area which is above a next sump section which is adjacent to and upstream of said associated sump section as viewed in the direction of movement of said upper conveyor belt run.

5. An apparatus as defined in claim 3 wherein said product cooling zone comprises pumping units arranged at intervals along said liquid collecting sump, for transferring cooling liquid from an associated section of said liquid collecting sump to an associated spray nozzle assembly for spraying therethrough, said associated spray nozzle assembly being located to spray said transferred liquid onto said upper conveyor belt run at an area which is above a next sump section which is adjacent to and upstream of said associated sump section as viewed in the direction of movement of said upper conveyor belt run.

6. An apparatus as defined in claim 1 and further comprising a product preheating zone arranged in said treatment tunnel as a first one of said treatment zones therein, said preheating zone comprising a nozzle arrangement including a plurality of spray nozzles arranged to spray preheating liquid onto said layer of product on said upper conveyor belt run.

7. An apparatus as defined in claim 3 and further comprising a product preheating zone arranged in said treatment tunnel as a first one of said treatment zones therein, said preheating zone comprising a nozzle arrangement including a plurality of spray nozzles arranged to spray preheating liquid onto said layer of product on said upper conveyor belt run.

8. An apparatus for blanching vegetable products and comprising in combination:
an elongate casing having a product inlet end and a product outlet end, said casing including longitudinally extending, opposite and spaced apart side walls, a floor which extends between said inlet and outlet ends and closes the spacing between said side walls to define a product treatment tunnel above aid floor, and successive product treatment zones between said inlet and outlet ends of said elongate casing within said product treatment tunnel,
a perforated product conveyor belt having an upper belt run for receiving and supporting a layer from said inlet end, through said product treatment zones to said outlet end, said upper belt run being arranged to move above said floor in spaced relation thereto,
a product feeder unit arranged at said product inlet end for receiving said vegetable product and supplying and distributing said vegetable product to said conveyor belt as an even layer across said upper belt run,
a product pre-heating zone arranged in said treatment tunnel as a first one of said treatment zones therein, said preheating zone comprising a nozzle arrangement including a plurality of spray nozzles arranged to spray preheating liquid onto said layer of product on said upper conveyor belt run,
a product blancing zone arranged in said treatment tunnel as a successive one of said treatment zones therein after said preheating zone therein, said blanching zone comprising a blancher nozzle arrangement including a plurality of spray nozzles arranged to spray heated blanching liquid onto said layer of product on said upper conveyor belt run,
a product cooling zone arranged in said treatment tunnel as a successive treatment zone therein after said blanching zone therein, said cooling zone comprising a nozzle arrangement including a plurality of spray nozzles arranged to spray cooling liquid onto said layer of product on said upper conveyor belt run,
a sectioned liquid collecting sump arranged to receive liquid from said product treatment tunnel at said floor thereof, sump sections below said blanching zone being separated from the remaining sump sections below said preheating and cooling zones,
a plurality of pumping units arranged at intervals along said product cooling zone and along said product preheating zone for transferring liquid from an associated section of said liquid collecting sump to an associated spray nozzle assembly for spraying therethrough, said associated spray nozzle assembly being located to spray said transferred liquid onto said upper conveyor belt run at an area which is above a next sump section which is adjacent to and upstream of said associated sump section as viewed in the direction of movement of said upper conveyor belt run,
at least one circulation pump for transferring said blanching liquid from an associated sump section below said blanching zone and to said blancher nozzle arrangement for spraying therethrough, said transfer being performed through means for controlled heating of said blanching liquid,
said blancher nozzle arrangement including upper spray nozzle units arranged above said upper conveyor belt run and directed towards a top surface thereof, as well as lower spray nozzle units arranged in the spacing between said floor and said upper belt run and directed towards an underside of said belt run, and
at least some of said spray nozzle assemblies in said preheating and cooling zones comprising upper spray nozzle units arranged above said upper conveyor belt run and directed towards the top surface thereof, as well as lower spray nozzle units arranged in the spacing between said floor and said upper belt run and directed towards the underside of said belt run.

9. An apparatus as defined in claim 8, wherein each of said pumping units comprises a pump having an outlet conduit for pressurized liquid, said outlet conduit being branched to supply pressurized liquid to upper spray nozzle units of a spray nozzle assembly associated with said pump, and to supply pressurized liquid to an ejector in a jet pump unit to cause said jet pump unit to supply liquid from an associated liquid sump section to lower spray nozzles of the spray nozzle assembly associated with said pump.

10. An apparatus as defined in claim 8, wherein a first sump section in said cooling zone, as viewed in the travelling direction of the upper conveyor belt run, is connected with a last sump section in said preheating zone through conduit means, said conduit means by-passing said blanching zone and including pump means for transferring liquid from said first sump section to said last sump section.

11. An apparatus as defined in claim 8, wherein a liquid outlet in a first cooling zone sump section, which is adjacent said blanching zone, is connected with a liquid inlet in a last cooling zone sump section through cooling liquid returning conduit means extending through one portion of a heat exchanger, whereby heat is removed from said cooling liquid during the returning thereof, and wherein a liquid outlet in a first preheater zone sump section, which is adjacent said product inlet, is connected with a liquid inlet in a last preheater zone sump section through preheating liquid returning conduit means extending through the other portion of said heat exchanger, whereby said preheating liquid is heated during the returning thereof.

12. An apparatus as defined in claim 10 wherein said liquid sump is defined as a longitudinally extending and generally gutter-shaped portion being sectioned by transverse partition walls, and wherein an upper run of an endless filter belt covers said sump gutter portion in such a manner that liquid has to pass through said filter belt before being collected in said sump gutter portion.

13. An apparatus as defined in claim 11 wherein said liquid sump is defined as a longitudinally extending and generally gutter-shaped portion being sectioned by transverse partition walls, and wherein an upper run of an endless filter belt covers said sump gutter portion in such a manner that liquid has to pass through said filter belt before being collected in said sump gutter portion.

14. An apparatus for blanching vegetable products and comprising in combination:
- an elongate casing having a product inlet end and a product outlet end, said casing including longitudinally extending, opposite and spaced apart side walls, a floor which extends between said inlet and outlet ends and closes the spacing between said side walls to define a product treatment tunnel above said floor, and successive product treatment zones between said inlet and outlet ends of said elongate casing within said product treatment tunnel,
- a perforated product conveyor belt having an upper belt run for receiving and supporting a layer of vegetable product thereon and for moving said layer from said inlet end, through said product treatment zones to said outlet end, said upper belt run being arranged to move above said floor in spaced relation thereto.
- a product feeder unit arranged at said product inlet end for receiving said vegetable product and supplying and distributing said vegetable product to said conveyor belt as an even layer across said upper belt run,
- a product pre-heating zone arranged in said treatment tunnel as a first one of said treatment zones therein, said preheating zone comprising a nozzle arrangement including a plurality of spray nozzles arranged to spray preheating liquid onto said layer of product on said upper conveyor belt run,
- a product blanching zone arranged in said treatment tunnel as a successive one of said treatment zones therein after said preheating zone therein, said blanching zone comprising a blancher nozzle arrangement including a plurality of spray nozzles arranged to spray heated blanching liquid onto said layer of product on said upper conveyor belt run,
- a product cooling zone arranged in said treatment tunnel as a successive one of said treatment zones therein after said blanching zone therein, said cooling zone comprising a nozzle arrangement including a plurality of spray nozzles arranged to spray cooling liquid onto said layer of product on said upper conveyor belt run,
- a sectioned liquid collecting sump arranged to receive liquid from said product treatment tunnel at said floor thereof, sump sections below said blanching zone being separated from the remaining sump sections below said preheating and cooling zones,
- a plurality of pumping units arranged at intervals along said product cooling zone and along said product preheating zone for transferring liquid from an associated section of said liquid collecting sump and to an associated spray nozzle assembly for spraying therethrough, said associated spray nozzle assembly being located to spray said transferred liquid onto said upper conveyor belt run at an area which is above a next sump section which is adjacent to and upstream of said associated sump section as viewed in the direction of movement of said upper conveyor belt run, and
- at least one circulation pump for transferring said blanching liquid from an associated sump section below said blanching zone to said blancher nozzle arrangement for spraying therethrough, said transfer being performed through means for controlled heating of said blanching liquid.

15. An apparatus as defined in claim 14, wherein said liquid sump is defined as a longitudinally extending and generally gutter-shaped portion being sectioned by transverse partition walls, and wherein an upper run of an endless filter belt covers said sump gutter portion in such a manner that liquid has to pass through said filter belt before being collected in said sump gutter portion.

16. An apparatus as defined in claim 14, wherein a first sump section in said cooling zone, as viewed in the travelling direction of the upper conveyor belt run, is connected with a last sump section in said preheating zone through conduit means, said conduit means by-passing said blanching zone and including pump means for transferring liquid from said first sump section to said last sump section.

17. An apparatus as defined in claim 14, wherein a liquid outlet in a first cooling zone sump section, which is adjacent said blanching zone, is connected with a liquid inlet in a last cooling zone sump section through cooling liquid returning conduit means extending through one portion of a heat exchanger, whereby heat is removed from said cooling liquid during the returning thereof, and wherein a liquid outlet in a first preheater zone sump section, which is adjacent said product inlet, is connected with a liquid inlet in a last preheater zone sump section through preheating liquid returning conduit means extending through the other portion of said heat exchanger, whereby said liquid is heated during the returning thereof.

* * * * *